United States Patent
Zhang

(10) Patent No.: US 10,536,900 B2
(45) Date of Patent: Jan. 14, 2020

(54) HEARTBEAT ADJUSTMENT METHOD, APPARATUS, AND TERMINAL

(71) Applicant: HUAWEI TECHNOLOGIES CO., LTD., Shenzhen, Guangdong (CN)

(72) Inventor: Yuanrong Zhang, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 280 days.

(21) Appl. No.: 15/317,918

(22) PCT Filed: Jun. 18, 2014

(86) PCT No.: PCT/CN2014/080225
§ 371 (c)(1),
(2) Date: Dec. 9, 2016

(87) PCT Pub. No.: WO2016/004558
PCT Pub. Date: Jan. 14, 2016

(65) Prior Publication Data
US 2017/0118709 A1    Apr. 27, 2017

(51) Int. Cl.
*H04W 52/02* (2009.01)
*H04W 4/50* (2018.01)
*G06F 1/3209* (2019.01)

(52) U.S. Cl.
CPC ......... *H04W 52/0216* (2013.01); *H04W 4/50* (2018.02); *Y02D 70/00* (2018.01)

(58) Field of Classification Search
CPC ............... H04W 52/0216; H04W 4/50; H04W 52/0258; Y02D 70/142; Y02D 70/1224; Y02D 70/00
See application file for complete search history.

(56) References Cited

U.S. PATENT DOCUMENTS

| 8,331,901 B2 | 12/2012 | Raleigh |
| 2007/0250619 A1* | 10/2007 | Li ................... G06F 19/3418 709/224 |

(Continued)

FOREIGN PATENT DOCUMENTS

| CN | 101631377 | 1/2010 |
| CN | 101631377 A | 1/2010 |

(Continued)

OTHER PUBLICATIONS

European Patent Application No. 14897104.7, Extended European Search Report, dated May 22, 2017, 12 pages.

*Primary Examiner* — Joseph E Dean, Jr.
(74) *Attorney, Agent, or Firm* — Womble Bond Dickinson (US) LLP

(57) ABSTRACT

Embodiments of the present invention disclose a heartbeat adjustment method, an apparatus, and a terminal. The method includes: acquiring a network holding time period of an application program; acquiring an initial heartbeat of the application program, and acquiring a to-be-adjusted heartbeat of the application program according to the network holding time period and the initial heartbeat; and acquiring at least one preset unified heartbeat, and adjusting the to-be-adjusted heartbeat according to the at least one preset unified heartbeat to obtain an adjusted heartbeat, where the adjusted heartbeat coincides with a unified heartbeat in the at least one unified heartbeat. The embodiments of the present invention can flexibly adjust a heartbeat of an application program according to a service requirement of the application program, to improve user experience and reduce power consumption.

15 Claims, 3 Drawing Sheets

(56) References Cited

U.S. PATENT DOCUMENTS

| | | | |
|---|---|---|---|
| 2012/0157170 A1 | 6/2012 | Backholm et al. | |
| 2013/0194993 A1* | 8/2013 | Choi | H04L 67/14 |
| | | | 370/311 |
| 2013/0204926 A1* | 8/2013 | Sakui | H04L 67/025 |
| | | | 709/203 |
| 2017/0083366 A1 | 3/2017 | Gou et al. | |

FOREIGN PATENT DOCUMENTS

| | | |
|---|---|---|
| CN | 102117114 | 7/2011 |
| CN | 102117114 A | 7/2011 |
| CN | 103118188 | 5/2013 |
| CN | 103118188 A | 5/2013 |
| EP | 2725869 A1 | 4/2014 |
| WO | WO-2014114194 | 7/2014 |

\* cited by examiner

HEARTBEAT ADJUSTMENT METHOD, APPARATUS, AND TERMINAL

CROSS-REFERENCE TO RELATED APPLICATIONS

This application is a National Stage of International Application No. PCT/CN2014/080225, filed on Jun. 18, 2014, which is hereby incorporated by reference in its entirety.

TECHNICAL FIELD

The present invention relates to the field of communications technologies, and in particular, to a heartbeat adjustment method, an apparatus, and a terminal.

BACKGROUND

Currently, more application programs can be installed on a terminal. Because heartbeat periods of application programs are mostly different, when the terminal is in a standby or blank screen state, if the application programs need to keep refreshing the status, or complete some transactions, each application program needs to regularly wake up the terminal according to a heartbeat period of the application program. Therefore, the terminal is woken up frequently, which increases power consumption of the terminal.

To resolve the foregoing problem, currently the terminal is woken up in a unified heartbeat period manner. The terminal adjusts heartbeat periods of the application programs to a unified heartbeat period, and in this way, the terminal is only woken up in the unified heartbeat period, which effectively reduces power consumption of the terminal.

However, in an existing process of adjusting heartbeats of application programs in a unified heartbeat manner, the terminal moves time points of the heartbeats of the application programs backward uniformly, so that the adjusted heartbeats coincide with the unified heartbeat. However, when some application programs are performing a service such as communication or information transmission, the service needs to be online in real time, but after the unified heartbeat is used, because a time point of a heartbeat is moved backward, a heartbeat interval of the service may exceed a network holding time period, that is, after the application program performs data interaction at a previous unified heartbeat, and when an interval between the unified heartbeat and the previous unified heartbeat exceeds the network holding time period, a network is cut off by an operator or a service. Therefore, a communication service that needs to be online in real time should be effectively transmitted, which causes inconvenience to a user.

SUMMARY

Embodiments of the present invention provide a heartbeat adjustment method, an apparatus, and a terminal, which can flexibly adjust a heartbeat of an application program, to improve user experience and reduce power consumption.

To resolve the foregoing technical problem, a first aspect of the present invention provides a heartbeat adjustment method, including: acquiring a network holding time period of an application program; acquiring an initial heartbeat of the application program, and acquiring a to-be-adjusted heartbeat of the application program according to the network holding time period and the initial heartbeat; and acquiring at least one preset unified heartbeat, and adjusting the to-be-adjusted heartbeat according to the at least one preset unified heartbeat to obtain an adjusted heartbeat, where the adjusted heartbeat coincides with a unified heartbeat in the at least one unified heartbeat.

With reference to the first aspect, in a first possible implementation manner, after the acquiring a network holding time period of an application program, the method includes: acquiring a service parameter of the application program, and making an adjustment policy for a heartbeat of the application program according to the service parameter, where the adjustment policy is used to indicate an adjustment direction of the to-be-adjusted heartbeat, and the adjustment direction includes any one of a forward-moving adjustment direction, a backward-moving adjustment direction, and no adjustment; and the adjusting the to-be-adjusted heartbeat according to the at least one preset unified heartbeat to obtain an adjusted heartbeat includes: adjusting the to-be-adjusted heartbeat according to the unified heartbeat and the adjustment policy to obtain the adjusted heartbeat.

With reference to the first possible implementation manner of the first aspect, in a second possible implementation manner, before the acquiring a service parameter of the application program, and making an adjustment policy for a heartbeat of the application program according to the service parameter, the method includes: acquiring a preset unified heartbeat, and acquiring, in the unified heartbeat, a first time interval between adjacent unified heartbeats; determining whether the network holding time period is greater than the first time interval; and when the network holding time period is greater than the first time interval, performing the step of acquiring a service parameter of the application program, and making an adjustment policy for a heartbeat of the application program according to the service parameter.

With reference to the first possible implementation manner of the first aspect, or the second possible implementation manner of the first aspect, in a third possible implementation manner, a time interval between the to-be-adjusted heartbeat and the initial heartbeat is the network holding time period of the application program.

With reference to the first possible implementation manner of the first aspect, or the second possible implementation manner of the first aspect, or the third possible implementation manner of the first aspect, in a fourth possible implementation manner, the adjusting the to-be-adjusted heartbeat according to the unified heartbeat and the adjustment policy to obtain the adjusted heartbeat includes: when the adjustment policy is used to indicate a forward-moving adjustment direction of the to-be-adjusted heartbeat, acquiring a first heartbeat in a unified heartbeat period, where a time interval between the first heartbeat and the to-be-adjusted heartbeat is the smallest, and a time point of the first heartbeat is earlier than or equal to a time point of the to-be-adjusted heartbeat; and moving the time point of the to-be-adjusted heartbeat forward to the time point of the first heartbeat, to obtain the adjusted heartbeat.

With reference to the first possible implementation manner of the first aspect, or the second possible implementation manner of the first aspect, or the third possible implementation manner of the first aspect, in a fifth possible implementation manner, the adjusting the to-be-adjusted heartbeat according to the unified heartbeat and the adjustment policy to obtain the adjusted heartbeat includes: when the adjustment policy is used to indicate a backward-moving adjustment direction of the to-be-adjusted heartbeat, acquiring a second heartbeat in a unified heartbeat period, where a time interval between the second heartbeat and the to-be-adjusted heartbeat is the smallest, and a time point of the second heartbeat is later than or equal to a time point of the to-be-adjusted heartbeat; and moving the time point of the to-be-adjusted heartbeat backward to the time point of the second heartbeat, to obtain the adjusted heartbeat.

With reference to the first aspect, or any one of the first possible implementation manner of the first aspect to the fifth possible implementation manner of the first aspect, in a sixth possible implementation manner, before the acquiring a network holding time period of an application program, the method includes: detecting whether a unified heartbeat system is already started; and when detecting that the unified heartbeat system is already started, performing the step of acquiring a network holding time period of an application program.

A second aspect of the present invention provides an apparatus, including: a first acquiring unit, configured to acquire a network holding time period of an application program; a second acquiring unit, configured to acquire an initial heartbeat of the application program, and acquire a to-be-adjusted heartbeat of the application program according to the network holding time period and the initial heartbeat; and an adjustment unit, configured to acquire at least one preset unified heartbeat, and adjust the to-be-adjusted heartbeat according to the at least one preset unified heartbeat to obtain an adjusted heartbeat, where the adjusted heartbeat coincides with a unified heartbeat in the at least one unified heartbeat.

With reference to the second aspect, in a first possible implementation manner, the apparatus includes: a making unit, configured to: after the first acquiring unit acquires the network holding time period of the application program, acquire a service parameter of the application program, and make an adjustment policy for a heartbeat of the application program according to the service parameter, where the adjustment policy is used to indicate an adjustment direction of the to-be-adjusted heartbeat, and the adjustment direction includes any one of a forward-moving adjustment direction, a backward-moving adjustment direction, and no adjustment, where the adjustment unit is specifically configured to adjust the to-be-adjusted heartbeat according to the unified heartbeat and the adjustment policy to obtain the adjusted heartbeat.

With reference to the first possible implementation manner of the second aspect, in a second possible implementation manner, the apparatus includes: a third acquiring unit, configured to: before the making unit makes the adjustment policy for the heartbeat of the application program according to the service parameter, acquire a preset unified heartbeat, and acquire, in the unified heartbeat, a first time interval between adjacent unified heartbeats; and a determining unit, configured to determine whether the network holding time period is greater than the first time interval, where the making unit is specifically configured to: when the determining unit determines that the network holding time period is greater than the first time interval, acquire the service parameter of the application program, and make the adjustment policy for the heartbeat of the application program according to the service parameter.

With reference to the first possible implementation manner of the second aspect, or the second possible implementation manner of the second aspect, in a third possible implementation manner, a time interval between the to-be-adjusted heartbeat and the initial heartbeat is the network holding time period of the application program.

With reference to the first possible implementation manner of the second aspect, or the second possible implementation manner of the second aspect, or the third possible implementation manner of the second aspect, in a fourth possible implementation manner, the adjustment unit includes: a first acquiring subunit, configured to: when the adjustment policy is used to indicate a forward-moving adjustment direction of the to-be-adjusted heartbeat, acquire a first heartbeat in a unified heartbeat period, where a time interval between the first heartbeat and the to-be-adjusted heartbeat is the smallest, and a time point of the first heartbeat is earlier than or equal to a time point of the to-be-adjusted heartbeat; and a forward-moving adjustment subunit, configured to move the time point of the to-be-adjusted heartbeat forward to the time point of the first heartbeat, to obtain the adjusted heartbeat.

With reference to the first possible implementation manner of the second aspect, or the second possible implementation manner of the second aspect, or the third possible implementation manner of the second aspect, in a fifth possible implementation manner, the adjustment unit includes: a second acquiring subunit, configured to: when the adjustment policy is used to indicate a backward-moving adjustment direction of the to-be-adjusted heartbeat, acquire a second heartbeat in a unified heartbeat period, where a time interval between the second heartbeat and the to-be-adjusted heartbeat is the smallest, and a time point of the second heartbeat is later than or equal to a time point of the to-be-adjusted heartbeat; and a backward-moving adjustment subunit, configured to move the time point of the to-be-adjusted heartbeat backward to the time point of the second heartbeat, to obtain the adjusted heartbeat.

With reference to the second aspect, or any one of the first possible implementation manner of the second aspect to the fifth possible implementation manner of the second aspect, in a sixth possible implementation manner, the apparatus includes: a detection unit, configured to: before the network holding time period of the application program is acquired, detect whether a unified heartbeat system is already started, where the first acquiring unit is specifically configured to: when the detection unit detects that the unified heartbeat system is already started, acquire the network holding time period of the application program.

A third aspect of the present invention provides a computer storage medium, where the computer storage medium stores a program, and when the program is executed, some or all steps of the foregoing heartbeat adjustment method are executed.

A fourth aspect of the present invention provides a terminal, where the terminal includes: a memory and a processor, where the memory stores a set of program code, and the processor is configured to invoke the program code stored in the memory, to perform the following operations: acquiring a network holding time period of an application program; acquiring an initial heartbeat of the application program, and acquiring a to-be-adjusted heartbeat of the application program according to the network holding time period and the initial heartbeat; and acquiring at least one preset unified heartbeat, and adjusting the to-be-adjusted heartbeat according to the at least one preset unified heartbeat to obtain an adjusted heartbeat, where the adjusted heartbeat coincides with a unified heartbeat in the at least one unified heartbeat.

With reference to the fourth aspect, in a first possible implementation manner, the processor is further configured to: after acquiring the network holding time period of the application program, acquire a service parameter of the application program, and make an adjustment policy for a heartbeat of the application program according to the service parameter, where the adjustment policy is used to indicate an adjustment direction of the to-be-adjusted heartbeat, and the adjustment direction includes any one of a forward-moving adjustment direction, a backward-moving adjustment direction, and no adjustment; and the adjusting, by the processor, the to-be-adjusted heartbeat according to the at least one preset unified heartbeat to obtain an adjusted heartbeat includes: adjusting the to-be-adjusted heartbeat according to the unified heartbeat and the adjustment policy to obtain the adjusted heartbeat.

With reference to the first possible implementation manner of the fourth aspect, in a second possible implementation manner, the processor is further configured to: before acquiring the service parameter of the application program, and making the adjustment policy for the heartbeat of the application program according to the service parameter, acquire a preset unified heartbeat, and acquire, in the unified heartbeat, a first time interval between adjacent unified heartbeats; and determine whether the network holding time period is greater than the first time interval; and when the network holding time period is greater than the first time interval, perform the step of acquiring a service parameter of the application program, and making an adjustment policy for a heartbeat of the application program according to the service parameter.

With reference to the first possible implementation manner of the first aspect, or the second possible implementation manner of the first aspect, in a third possible implementation manner, a time interval between the to-be-adjusted heartbeat and the initial heartbeat is the network holding time period of the application program.

With reference to the first possible implementation manner of the fourth aspect, or the second possible implementation manner of the fourth aspect, or the third possible implementation manner of the fourth aspect, in a fourth possible implementation manner, the adjusting, by the processor, the to-be-adjusted heartbeat according to the unified heartbeat and the adjustment policy to obtain the adjusted heartbeat includes: when the adjustment policy is used to indicate a forward-moving adjustment direction of the to-be-adjusted heartbeat, acquiring a first heartbeat in a unified heartbeat period, where a time interval between the first heartbeat and the to-be-adjusted heartbeat is the smallest, and a time point of the first heartbeat is earlier than or equal to a time point of the to-be-adjusted heartbeat; and moving the time point of the to-be-adjusted heartbeat forward to the time point of the first heartbeat, to obtain the adjusted heartbeat.

With reference to the first possible implementation manner of the fourth aspect, or the second possible implementation manner of the fourth aspect, or the third possible implementation manner of the fourth aspect, in a fifth possible implementation manner, the adjusting, by the processor, the to-be-adjusted heartbeat according to the unified heartbeat and the adjustment policy to obtain the adjusted heartbeat includes: when the adjustment policy is used to indicate a backward-moving adjustment direction of the to-be-adjusted heartbeat, acquiring a second heartbeat in a unified heartbeat period, where a time interval between the second heartbeat and the to-be-adjusted heartbeat is the smallest, and a time point of the second heartbeat is later than or equal to a time point of the to-be-adjusted heartbeat; and moving the time point of the to-be-adjusted heartbeat backward to the time point of the second heartbeat, to obtain the adjusted heartbeat.

With reference to the fourth aspect, or any one of the first possible implementation manner of the fourth aspect to the fifth possible implementation manner of the fourth aspect, in a sixth possible implementation manner, the processor is further configured to: before acquiring the network holding time period of the application program, detect whether a unified heartbeat system is already started; and when detecting that the unified heartbeat system is already started, perform the step of acquiring a network holding time period of an application program.

In the embodiments of the present invention, a network holding time period of an application program and an initial heartbeat of the application program are acquired, and a to-be-adjusted heartbeat of the application program is acquired according to the network holding time period and the initial heartbeat, so as to acquire a preset unified heartbeat. The to-be-adjusted heartbeat is adjusted according to the at least one preset unified heartbeat to obtain an adjusted heartbeat, so that the terminal can flexibly adjust a heartbeat of the application program according to a service requirement of the application program, and adjust a position of the heartbeat of the running application program to a position of a unified heartbeat, to improve user experience and reduce power consumption.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may he executed by a terminal such as a mobile phone, a tablet computer, or a notebook.

Figure 1:
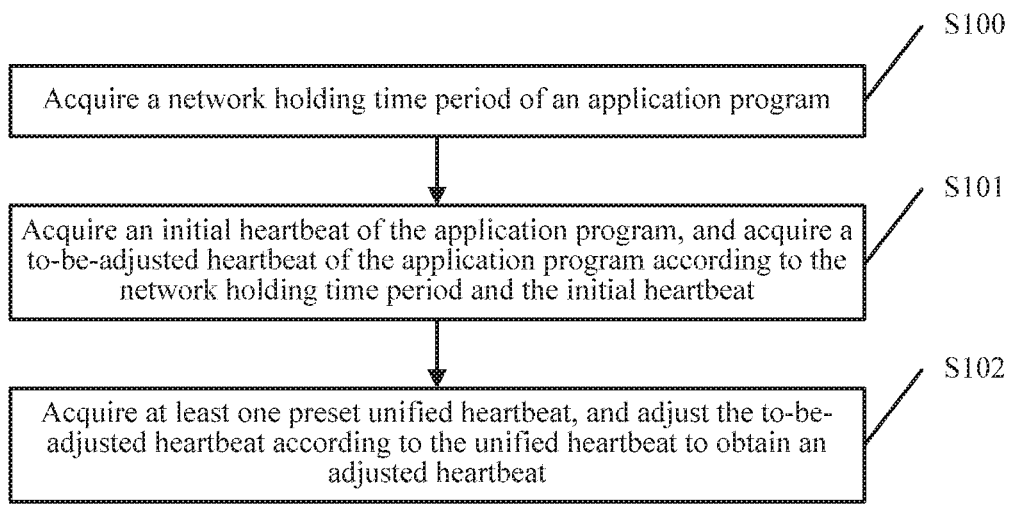
FIG. 1 is a schematic flowchart of a heartbeat adjustment method according to an embodiment of the present invention.

Referring to FIG. 1, FIG. 1 is a schematic flowchart of an embodiment of a heartbeat adjustment method according to the present invention. As shown in FIG. 1, the heartbeat adjustment method of this embodiment may include steps:

S100: Acquire a network holding time period of an application program.

In this embodiment of the present invention, the network holding time period may be a maximum online time of a service of the application program, that is, after the application program performs previous data interaction, the application program may perform service data communication in the network holding time period, and when a time interval from a time of the previous data interaction exceeds the network holding time period, a network is cut off by an operator or a service. For example, when a terminal is in a standby state, when a time interval of heartbeats that is required by a service of the application program is the network holding time period, assuming that the time interval is a, where a>0, after data interaction in performed at a previous heartbeat, service data communication may be performed in this time interval, to ensure that the application program is online in real time. However, when a time interval of heartbeats that is set by the application program is greater than the network holding time period, assuming that the time interval is b, where b>a, after service data interaction is performed at a previous heartbeat, because a time interval between the heartbeat and the previous heartbeat is greater than the network holding time period, when the application program is woken up at the next heartbeat, the service of the application program may already be lost, or a network may have been cut off by an operator or a service. The heartbeat may be a timer that wakes up the application program, and each timer corresponds to a time point. When timed duration of the terminal reaches a time point corresponding to a timer, the timer is triggered, and the terminal may wake up the application program, so as to complete some service interaction of the application program. That is, it may be understood that, the timer is similar to a physiological heartbeat of the human or creature, may be triggered to wake up an application program once for a period, to perform data interaction, and may determine whether the terminal is "alive". Therefore, a person skilled in the art may refer to the timer, which wakes up an application program to perform data interaction, as a heartbeat.

In this embodiment of the present invention, the terminal may acquire the network holding time period of the application program by using a preset algorithm such as a step algorithm or bisection. For example, when the terminal calculates the network holding time period of the application program by using the step algorithm, the terminal may preset a step value, for example, preset 0.5 min (minutes), where a specific preset value may be adjusted according to a precision required by a user. The terminal may first set a heartbeat whose time interval is 2 min. When the terminal determines that service data communication can be performed in 2 min, the terminal may set, according to the preset step value, a heartbeat whose time interval is 2.5 min. When the terminal determines that service data communication can still be performed in 2.5 min, the terminal may still adjust the time interval of the heartbeat, until the terminal determines that the service data communication cannot remain continuous in a time period (such as 10 min). Then, the terminal may acquire the time period, and subtract the step value from the time period to obtain the network holding time period of the application program, for example, 10 min−0.5 min=9.5 min, and 9.5 min is the network holding time period of the application program.

Further, in this embodiment of the present invention, before acquiring the network holding time period of the application program, the terminal may first detect whether to acquire and adjust the heartbeat of the application program. For example, the terminal may detect whether the terminal is in a standby state, and acquire the network holding time period of the application program when the terminal is in a standby state; or the terminal may detect whether a start instruction of acquiring the network holding time period of the application program is received, and acquire the network holding time period of the application program when receiving the start instruction. The start instruction may be a start instruction that is generated by a user by operating the terminal.

Preferably, in this embodiment of the present invention, the terminal may preset a unified heartbeat system. When the terminal is in a standby state or receives the start instruction of acquiring the network holding time period of the application program, the terminal starts the unified heartbeat system. Then, the terminal may detect whether the terminal is in a standby state or receives the start instruction, to determine whether the unified system is started. When the terminal detects that the unified heartbeat system is started, the terminal acquires the network holding time period of the application program. The unified heartbeat system may he an application, or a segment of program code, and is used to instruct the terminal to use the unified heartbeat to adjust the heartbeat of the application program. At least one unified heartbeat may be preset for the unified heartbeat system. Preferably, the unified heartbeat may be a periodic heartbeat, that is, time intervals between adjacent unified heartbeats are the same, where in continuous unified heartbeats, a heartbeat and a heartbeat that precedes or follows the heartbeat are referred to as adjacent heartbeats. Specifically, the unified heartbeat may be a timer that wakes up the terminal, and each tinier corresponds to a time point. When timed duration of the terminal reaches a time point of a timer, the timer is triggered, and the system wakes up the terminal. It may be understood that, the unified heartbeat system may be used to adjust the heartbeat of the running application program to a position of the unified heartbeat according to the preset unified heartbeat, so that application program is woken up according to the unified heartbeat, to reduce power consumption of the terminal. Further, when the unified heartbeat system adjusts the heartbeat of the application program to be consistent with the unified heartbeat, and when the unified heartbeat is triggered, the system wakes up the application program while waking up the terminal. The terminal may receive the start instruction that is generated by the user by operating the terminal, to start the unified heartbeat system; or when the terminal detects that the terminal is in a standby or blank screen state, the terminal starts the unified heartbeat system, which is not limited in this embodiment of the present invention.

In a specific application of this embodiment of the present invention, when the terminal starts the unified heartbeat system, the terminal may instruct the unified heartbeat system not to adjust the heartbeat of the application program for the present, and the terminal acquires the network holding time period of the application program through calculation.

Further, in a specific application, the unified heartbeat system may preset an interface for interacting with the application program and the terminal. When the terminal starts the unified heartbeat system, the terminal may invoke the interface of the unified heartbeat system to send a control instruction to the unified heartbeat system by means of reflecting, broadcasting, or another signal interaction, to instruct the unified heartbeat system not to adjust the heartbeat of the application program for the present. When the unified heartbeat system receives the control instruction, the unified heartbeat system responds to the control instruction, and does not adjust the heartbeat of the application program, and at this time, the terminal may enter a coordination period, and the terminal acquires the network holding time period of the application program.

S101: Acquire an initial heartbeat of the application program, and acquire a to-be-adjusted heartbeat of the application program according to the network holding time period and the initial heartbeat.

In this embodiment of the present invention, the initial heartbeat may be the first heartbeat of the application program after the terminal is in a standby state or receives the start instruction. Preferably, the initial heartbeat may be the first heartbeat of the application program after the terminal starts the unified heartbeat system. The terminal may preset the initial heartbeat of the application program. Specifically, the terminal may preset a time point as a time point of the initial heartbeat of the application program, so as to obtain the initial heartbeat. Preferably, the terminal may preset a current time point as a time point of the initial heartbeat of the application program, so as to obtain the initial heartbeat; or the terminal may use any unified heartbeat in the preset unified heartbeat as the initial heartbeat.

Further, the terminal may obtain the to-be-adjusted heartbeat according to network holding time period and the initial heartbeat, where a time interval between the to-be-adjusted heartbeat and the initial heartbeat may be the network holding time period. For example, when the time point, preset by the terminal, of the initial heartbeat of the application program is 00:00 min, and the network holding time period of the application program is 7 min, a time point of the to-be-adjusted heartbeat of the application program is 00:07 min.

S102: Acquire at least one preset unified heartbeat, and adjust the to-be-adjusted heartbeat according to the at least one preset unified heartbeat to obtain an adjusted heartbeat, where the adjusted heartbeat coincides with a unified heartbeat in the at least one unified heartbeat.

The terminal may acquire at least one preset unified heartbeat. Optionally, the unified heartbeat may be a periodic heartbeat, that is, time intervals between adjacent unified heartbeats are the same. Specifically, the unified heartbeat may be a timer that wakes up the terminal, and each timer corresponds to a time point. When timed duration of the terminal reaches a time point of a timer, the timer is triggered, and the system wakes up the terminal. The terminal, the unified heartbeat, the initial heartbeat of the foregoing embodiment, and the heartbeat of the foregoing embodiment share one timeline.

In a specific application, when the terminal presets a unified heartbeat system, the unified heartbeat system may preset at least one unified heartbeat, and the terminal acquire the at least one unified heartbeat preset by the unified heartbeat system.

In this embodiment of the present invention, the terminal may acquire continuous unified heartbeats, and adjust the to-be-adjusted heartbeat according to the unified heartbeats, to obtain the adjusted heartbeat.

Optionally, the terminal may move a time point of the to-be-adjusted heartbeat forward to obtain the adjusted heartbeat. The moving a time point of the to-be-adjusted heartbeat forward to obtain the adjusted heartbeat may include: acquiring, by the terminal, a first heartbeat in a unified heartbeat period on the timeline that is shared by the unified heartbeat, the initial heartbeat, and the heartbeat, where a time interval between the first heartbeat and the to-be-adjusted heartbeat is the smallest, and a time point of the first heartbeat is earlier than or equal to a time point of the to-be-adjusted heartbeat. When the first heartbeat is acquired, a position of the to-be-adjusted heartbeat may be moved forward on the timeline to a position of the first heartbeat, to obtain the adjusted heartbeat, that is, the time point of the to-be-adjusted heartbeat is moved forward to the time point of the first heartbeat, so that the to-be-adjusted heartbeat coincides with the first heartbeat in a unified heartbeat period.

Optionally, the terminal may move a time point of the to-be-adjusted heartbeat backward, to obtain the adjusted heartbeat. The moving a time point of the to-be-adjusted heartbeat backward to obtain the adjusted heartbeat may include: acquiring, by the terminal, a second heartbeat in a unified heartbeat period on the timeline that is shared by the unified heartbeat, the initial heartbeat, and the heartbeat, where a time interval between the second heartbeat and the to-be-adjusted heartbeat is the smallest, and a time point of the second heartbeat is later than or equal to a time point of the to-be-adjusted heartbeat. When the second heartbeat is acquired, a position of the to-be-adjusted heartbeat may be moved backward on the timeline to a position of the second heartbeat, to obtain the adjusted heartbeat, that is, the time point of the to-be-adjusted heartbeat is moved backward to the time point of the second heartbeat, so that the to-be-adjusted heartbeat coincides with the second heartbeat in a unified heartbeat period.

Optionally, the terminal may perform no adjustment on the to-be-adjusted heartbeat.

In this embodiment of the present invention, a network holding time period of an application program and an initial heartbeat of the application program are acquired in the present invention, and a to-be-adjusted heartbeat of the application program is acquired according to the network holding time period and the initial heartbeat, so as to acquire a preset unified heartbeat; the to-be-adjusted heartbeat is adjusted according to the at least one preset unified heartbeat to obtain an adjusted heartbeat, so that the terminal can adjust a heartbeat of the application program, and adjust a position of the heartbeat of the running application program to a position of a unified heartbeat, so that the application program is triggered and woken up according to the unified heartbeat, to reduce power consumption of the terminal.

Figure 2:
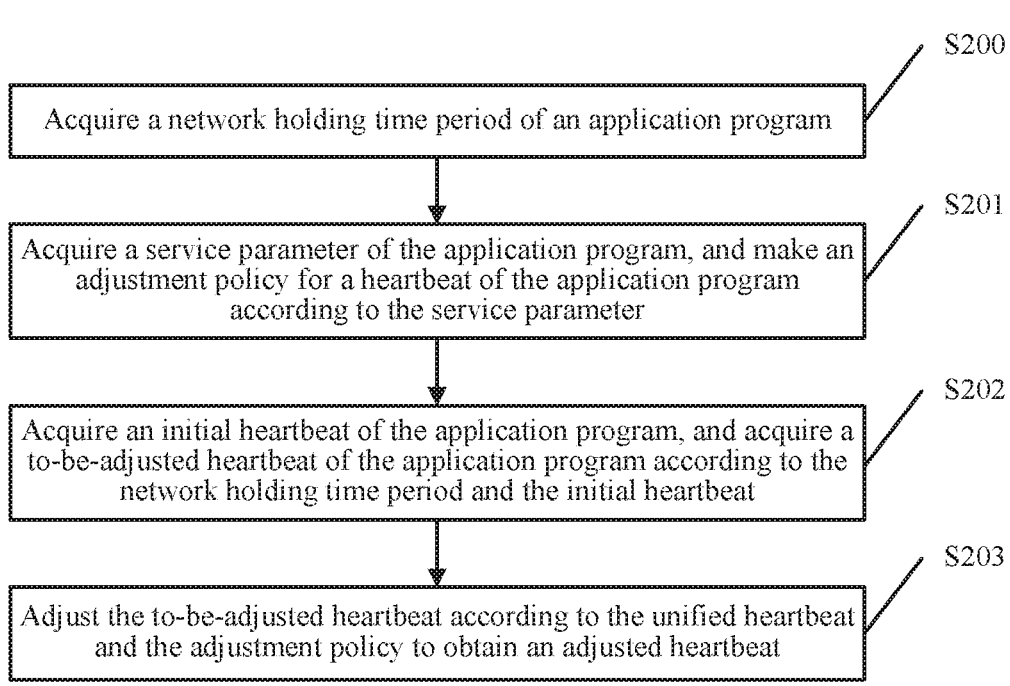
FIG. 2 is a schematic flowchart of a heartbeat adjustment method according to an embodiment of the present invention.

Referring to FIG. 2, FIG. 2 is a schematic flowchart of another embodiment of a heartbeat adjustment method according to the present invention. As shown in FIG. 2, the heartbeat adjustment method of this embodiment may include steps:

S200: Acquire a network holding time period of an application program.

S201: Acquire a service parameter of the application program, and make an adjustment policy for a heartbeat of the application program according to the service parameter.

In this embodiment of the present invention, before acquiring the service parameter of the application program, and making the adjustment policy for the heartbeat of the application program according to the service parameter, the terminal further acquires at least one preset unified heartbeat, where the unified heartbeat may be a periodic heartbeat, that is, time intervals between adjacent unified heartbeats are the same. Further, when the terminal acquires continuous unified heartbeats, the terminal may acquire a first time interval between adjacent unified heartbeats. Further, because the unified heartbeat is a periodic heartbeat, the first time interval between adjacent heartbeats may be a periodic time period of the unified heartbeat.

Further, when the terminal acquires the first time interval between adjacent heartbeats, the terminal may determine whether the network holding time period is greater than the first time interval; and when the network holding time period is greater than the first time interval, perform the step of acquiring a service parameter of the application program, and making an adjustment policy for a heartbeat of the application program according to the service parameter. When the network holding time period is less than or equal to the first time interval, the terminal stops performing steps of the present invention.

Further, in this embodiment of the present invention, the service parameter includes parameters such as a service type, a service name, and a real-time performance requirement of the service in the application program, and the terminal may determine, according to the service parameter, whether a service of the application program can be cut off or should be effectively transmitted.

In a specific application, for example, when the application program is instant messaging software, that is, a service type of the instant messaging software is instant messaging; the application program is instant messaging software, that is, generated information needs to be transmitted in time, and otherwise, user experience is affected; therefore, a real-time performance requirement level of the service may be high. That is, it may be understood that, a heartbeat interval of the instant messaging software cannot exceed the network holding time period, and a service cannot be cut off or should be effectively transmitted. When the application program is email software, a service type of the email software may be email; the application program is email software, that is, generated information does not need to be transmitted in time, and transmission can be performed when the program is triggered next time; therefore, it may be understood that, a heartbeat interval of the email software may exceed the network holding time period, and a service can be cut off and transmission may be delayed. Further, some application programs do not allow a heartbeat interval to exceed the network holding time period in a time period, but allow the heartbeat interval to exceed the network holding time period in another time period. Specifically, whether the application program allows the heartbeat interval to exceed the network holding time period may be determined according to the service parameter. Further, there are some application programs that may allow the heartbeat to be not adjusted. For example, when the application program is snap-up software, the snap-up software acquires an item according to a releasing frequency of the item, and therefore generated information may be transmitted according to a heartbeat of the application program and the heartbeat does not need to he adjusted. Therefore, it may be understood that, a heartbeat of the snap-up software may not be adjusted.

Further, the terminal may determine, according to the service parameter, whether the application program allows the heartbeat interval to exceed the network holding time period, to make the adjustment policy. When multiple application programs are built into the terminal, the terminal may determine, according to service parameters of the multiple application programs, whether the application programs allow the respective heartbeat intervals to exceed network holding time periods corresponding to the applications, to make adjustment policies corresponding to the application programs. The terminal may make a corresponding policy when determining, according to the service parameter, that the application program may not be adjusted.

In this embodiment of the present invention, the adjustment policy is used to indicate an adjustment direction of a to-be-adjusted heartbeat, and the adjustment direction includes any one of a forward-moving adjustment direction, a backward-moving adjustment direction, and no adjustment.

Specifically, when the application program allows the heartbeat interval to exceed the network holding time period, the adjustment policy may he used to indicate the backward-moving adjustment direction of the to-be-adjusted heartbeat of the application program; when the application program does not allow the heartbeat interval to exceed the network holding time period, the adjustment policy may be used to indicate the forward-moving adjustment direction of the to-be-adjusted heartbeat of the application program. When the application program allows the heartbeat to be not adjusted, the adjustment policy may be used to indicate no adjustment of the to-be-adjusted heartbeat of the application program.

Further preferably, when there is a service need, the terminal may re-make an adjustment policy. For example, the terminal is in a general packet radio service (GPRS) network, and a network holding time period of an application program of instant messaging is 10 minutes; after being handed over to a Wireless Fidelity (WIFI) network, the terminal finds the application of instant messaging is often off line, and then the terminal may re-make an adjustment policy for the application program.

In a specific application, in a case in which the terminal starts a unified heartbeat system, when the terminal acquires the service parameter of the application program, and makes the adjustment policy for the heartbeat of the application program according to the service parameter, a unified heartbeat management system still does not adjust the heartbeat of the application program, and in this case, the terminal may still be in a coordination period. Specifically, a time for making the adjustment policy for the application program by the terminal can be controlled, and an adjustment time in an entire heartbeat adjustment process can be neglected.

S202: Acquire an initial heartbeat of the application program, and acquire a to-be-adjusted heartbeat of the application program according to the network holding time period and the initial heartbeat.

S203: Acquire at least one preset unified heartbeat, and adjust the to-be-adjusted heartbeat according to the unified heartbeat and the adjustment policy to obtain the adjusted heartbeat.

In this embodiment of the present invention, the terminal may acquire continuous unified heartbeats, and adjust the to-be-adjusted heartbeat according to the unified heartbeats and the adjustment policy, to obtain the adjusted heartbeat.

Optionally, when the adjustment policy is used to indicate a forward-moving adjustment direction of the to-be-adjusted heartbeat, the terminal moves a time point of the to-be-adjusted heartbeat forward to obtain the adjusted heartbeat. The moving a time point of the to-be-adjusted heartbeat forward to obtain the adjusted heartbeat may include: acquiring, by the terminal, a first heartbeat in a unified heartbeat period on the timeline that is shared by the unified heartbeat, the initial heartbeat, and the heartbeat, where a time interval between the first heartbeat and the to-be-adjusted heartbeat is the smallest, and a time point of the first heartbeat is earlier than or equal to a time point of the to-be-adjusted heartbeat. When the first heartbeat is acquired, a position of the to-be-adjusted heartbeat may be moved forward on the timeline to a position of the first heartbeat, to obtain the adjusted heartbeat, that is, the time point of the to-be-adjusted heartbeat is moved forward to the time point of the first heartbeat, so that the to-be-adjusted heartbeat coincides with the first heartbeat in a unified heartbeat period.

Figure 3:
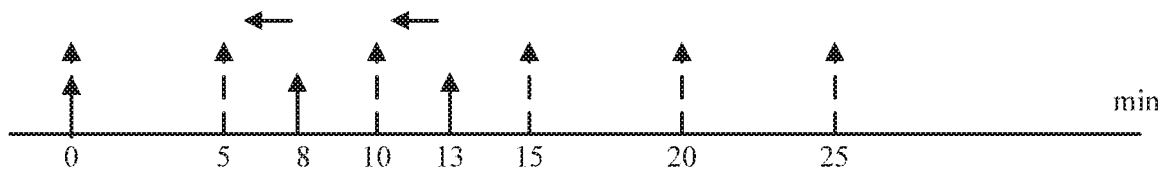
FIG. 3 is a timeline sequence diagram of heartbeat forward-moving of an application program according to an embodiment of the present invention.

Specifically, refer to a timeline sequence diagram of heartbeat forward-moving of an application program in FIG. 3. FIG. 3 is a sequence diagram of a to-be-adjusted heartbeat of an application program in a terminal on a timeline and a sequence diagram of a unified heartbeat on a timeline. As shown in FIG. 3, a dashed arrow represents the unified heartbeat that periodically appears, and a solid arrow represents the to-be-adjusted heartbeat of the application program. As shown in FIG. 3, an initial heartbeat of the application program is 00:00 min, a period of the unified heartbeat is 5 min, and a network holding time period of the application program is 8 min. Then, it may be understood that, a time point of the to-be-adjusted heartbeat of the application program is 00:08 min. Therefore, the terminal may obtain a first heartbeat of 00:05 min in the unified heartbeat according to the to-be-adjusted heartbeat, where a time interval between the first heartbeat and the to-be-adjusted heartbeat is the smallest, and a time point of the first heartbeat is earlier than a time point of the to-be-adjusted heartbeat. Then, the terminal may adjust the position of the to-be-adjusted heartbeat forward in a direction of the arrow shown in FIG. 3, and move the position of the to-be-adjusted heartbeat forward to the position of the first heartbeat, that is, the terminal may change the time point 00:08 min of the to-be-adjusted heartbeat to 00:05 min. The to-be-adjusted heartbeat whose time point has been changed is the adjusted heartbeat, the adjusted heartbeat coincides with the first heartbeat of 00:05 min in the unified heartbeat period, and a time interval between the adjusted heartbeat and the initial heartbeat is 5 min, less than the network holding time period, which effectively ensures effectiveness of a service of the application program.

Optionally, when the adjustment policy is used to indicate a backward-moving adjustment direction of the to-be-adjusted heartbeat, a time point of the to-be-adjusted heartbeat is moved backward to obtain the adjusted heartbeat. The moving a time point of the to-be-adjusted heartbeat backward to obtain the adjusted heartbeat may include: acquiring, by the terminal, a second heartbeat in a unified heartbeat period on the timeline that is shared by the unified heartbeat, the initial heartbeat, and the heartbeat, where a time interval between the second heartbeat and the to-be-adjusted heartbeat is the smallest, and a time point of the second heartbeat is later than or equal to a time point of the to-be-adjusted heartbeat. When the second heartbeat is acquired, a position of the to-be-adjusted heartbeat may be moved backward on the timeline to a position of the second heartbeat, to obtain the adjusted heartbeat, that is, the time point of the to-be-adjusted heartbeat is moved backward to the time point of the second heartbeat, so that the to-be-adjusted heartbeat coincides with the second heartbeat in a unified heartbeat period.

Figure 4:
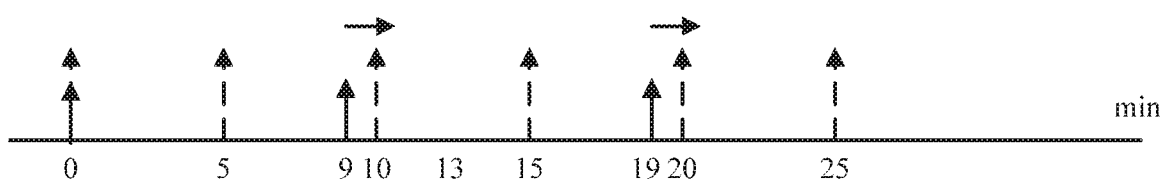
FIG. 4 is a timeline sequence diagram of heartbeat backward-moving of an application program according to an embodiment of the present invention.

Specifically, refer to a timeline sequence diagram of heartbeat backward-moving of an application program in FIG. 4. FIG. 4 is a sequence diagram of a to-be-adjusted heartbeat of an application program in a terminal on a timeline and a sequence diagram of a unified heartbeat on a timeline. As shown in FIG. 4, a dashed arrow represents the unified heartbeat that periodically appears, and a solid arrow represents the to-be-adjusted heartbeat of the application program. As shown in FIG. 4, an initial heartbeat of the application program is 00:00 min, a period of the unified heartbeat is 5 min, and a network holding time period of the application program is 9 min. Then, it may be understood that, a time point of the to-be-adjusted heartbeat of the application program is 00:09 min. Therefore, the terminal may obtain a second heartbeat of 00:10 min in the unified heartbeat according to the to-be-adjusted heartbeat, where a time interval between the second heartbeat and the to-be-adjusted heartbeat is the smallest, and a time point of the second heartbeat is later than or equal to a time point of the to-be-adjusted heartbeat. Then, the terminal may move the position of the to-be-adjusted heartbeat backward to the position of the second heartbeat in a direction of the arrow shown in FIG. 4, that is, the terminal may the time point 00:09 min of the to-be-adjusted heartbeat to 00:10 min. The to-be-adjusted heartbeat whose time point has been changed is the adjusted heartbeat, and the adjusted heartbeat coincides with the second heartbeat of 00:10 min in the unified heartbeat.

Further preferably, when the adjustment policy is used to indicate no adjustment of the to-be-adjusted heartbeat, no adjustment is performed on the to-be-adjusted heartbeat.

In this embodiment of the present invention, when the terminal obtains the adjusted heartbeat, the terminal saves the obtained adjusted heartbeat, and may use the adjusted heartbeat as a new initial heartbeat, so that the terminal acquires the to-be-adjusted heartbeat according to the new initial heartbeat and the network holding time period, and adjusts the to-be-adjusted heartbeat according to the at least one preset unified heartbeat to obtain an adjusted heartbeat. This step may be performed repeatedly, and operation is stopped until an exit instruction generated by operating by a user is received.

Specifically, when the adjustment policy obtained by the terminal is used to indicate a forward-moving adjustment direction of the to-be-adjusted heartbeat, referring to FIG. 3, the network holding time period of the application program is 8 min. After the terminal obtains the adjusted heartbeat of 00:05 min of the application program, the terminal saves the adjusted heartbeat, and may use the adjusted heartbeat of 00:05 min as a new initial heartbeat, so that the terminal obtains another to-be-adjusted heartbeat of 00:13 min of the application program. Therefore, the terminal may further adjust, according to the adjustment policy used to indicate a forward-moving adjustment direction of the to-be-adjusted heartbeat, the to-be-adjusted heartbeat of 00:13 min according to a direction of the arrow shown in FIG. 3, that is, the terminal may change a time 00:13 min of the to-be-adjusted heartbeat to 00:10 min. We may understand from the foregoing that, after the terminal obtains the adjusted heartbeat of the application program, the terminal may use the adjusted heartbeat as a new initial heartbeat, acquire the to-be-adjusted heartbeat of the application program according to the network holding time, and adjust the to-be-adjusted heartbeat according to the unified heartbeat and the adjustment policy to obtain an adjusted heartbeat. The terminal may repeat this process continuously, and stop operation until an exit instruction generated by operating by a user is received.

Specifically, when the adjustment policy obtained by the terminal is used to indicate a backward-moving adjustment direction of the to-be-adjusted heartbeat, referring to FIG. 4, the network holding time period of the application program is 9 min. After the terminal obtains the adjusted heartbeat of 00:10 min of the application program, the terminal saves the adjusted heartbeat, and may use the adjusted heartbeat of 00:10 min as a new initial heartbeat, so that the terminal obtains the to-be-adjusted heartbeat of 00:19 min of the application program. Therefore, the terminal may further adjust, according to the adjustment policy used to indicate a backward-moving adjustment direction of the to-be-adjusted heartbeat, the to-be-adjusted heartbeat of 00:19 min according to a direction of the arrow shown in FIG. 4, and change a time 00:19 min of the to-be-adjusted heartbeat to 00:20 min. We may understand from the foregoing that, after the terminal obtains the adjusted heartbeat of the application program, the terminal may use the adjusted heartbeat as a new initial heartbeat, acquire the to-be-adjusted heartbeat of the application program according to the network holding time, and adjust the to-be-adjusted heartbeat according to the unified heartbeat and the adjustment policy to obtain an adjusted heartbeat. The terminal may repeat this process continuously, and stop operation until an exit instruction generated by operating by a user is received.

In a specific application, when the terminal is in the unified heartbeat system, and after obtaining the adjustment policy of the application program in a coordination period, the terminal may exit a coordination period, acquire a heartbeat of the application program, invoke an interface of the unified heartbeat system, and send the adjustment policy of the application program and the heartbeat of the application program to the unified heartbeat system, so that the unified heartbeat system adjusts, according to the adjustment policy, the heartbeat, obtained by terminal, of the application program by moving the heartbeat backward or forward, and at this time, the terminal enters an operating period.

Further, in this embodiment of the present invention, after the terminal acquires the adjusted heartbeat of the application program, the terminal saves the adjusted heartbeat, so that the application program is woken up according to the adjusted heartbeat.

In this embodiment of the present invention, when the terminal exits the unified heartbeat system, or the terminal in not in a standby state, the terminal does not need to perform related adjustment on the application program, and the application program can be normally used.

In this embodiment of the present invention, for step S200 and step S202, reference may be made to step S100 and step S101 in the foregoing embodiment, and details are not described herein again.

In this embodiment of the present invention, a network holding time period of an application program and a service parameter of the application program are acquired in the present invention; an adjustment policy for a heartbeat of the application program is made according to the service parameter, and then an initial heartbeat of the application program is acquired; a to-be-adjusted heartbeat of the application program is acquired according to the network holding time period and the initial heartbeat, and a preset unified heartbeat is acquired last; the to-be-adjusted heartbeat is adjusted according to the unified heartbeat and the adjustment policy to obtain an adjusted heartbeat, so that the terminal can flexibly adjust a heartbeat of the application program according to the adjustment policy, to improve user experience and reduce power consumption.

To facilitate better implementation of the foregoing solutions of the embodiments of the present invention, the following further provides related apparatuses configured to cooperatively implement the foregoing solutions.

Figure 5:
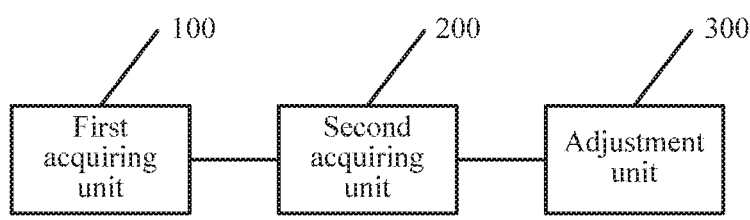
FIG. 5 is a schematic structural diagram of an apparatus according to an embodiment of the present invention.

Referring to FIG. 5, FIG. 5 is an apparatus provided in an embodiment e present invention. As shown in FIG. 5, the apparatus of this embodiment may include:

a first acquiring unit 100, configured to acquire a network holding time period of an application program;

a second acquiring unit 200, configured to acquire an initial heartbeat of the application program, and acquire a to-be-adjusted heartbeat of the application program according to the network holding time period and the initial heartbeat; and an adjustment unit 300, configured to acquire at least one preset unified heartbeat, and adjust the to-be-adjusted heartbeat according to the at least one preset unified heartbeat to obtain an adjusted heartbeat, where the adjusted heartbeat coincides with a unified heartbeat in the at least one unified heartbeat.

The apparatus further includes:

a making unit 400, configured to: after the first acquiring unit acquires the network holding time period of the application program, acquire a service parameter of the application program, and make an adjustment policy for a heartbeat of the application program according to the service parameter, where the adjustment policy is used to indicate an adjustment direction of the to-be-adjusted heartbeat, and the adjustment direction includes any one of a forward-moving adjustment direction, a backward-moving adjustment direction, and no adjustment, where the adjustment unit 300 is specifically configured to adjust the to-be-adjusted heartbeat according to the unified heartbeat and the adjustment policy to obtain the adjusted heartbeat.

The apparatus further includes:

a third acquiring unit 500, configured to: before the making unit makes the adjustment policy for the heartbeat of the application program according to the service parameter, acquire a preset unified heartbeat, and acquire, in the unified heartbeat, a first time interval between adjacent unified heartbeats; and a determining unit 600, configured to determine whether the network holding time period is greater than the first time interval, where the making unit 400 is specifically configured to: when the determining unit 600 determines that the network holding time period is greater than the first time interval, acquire the service parameter of the application program, and make the adjustment policy for the heartbeat of the application program according to the service parameter.

A time interval between the to-be-adjusted heartbeat and the initial heartbeat is the network holding time period of the application program.

Figure 6:
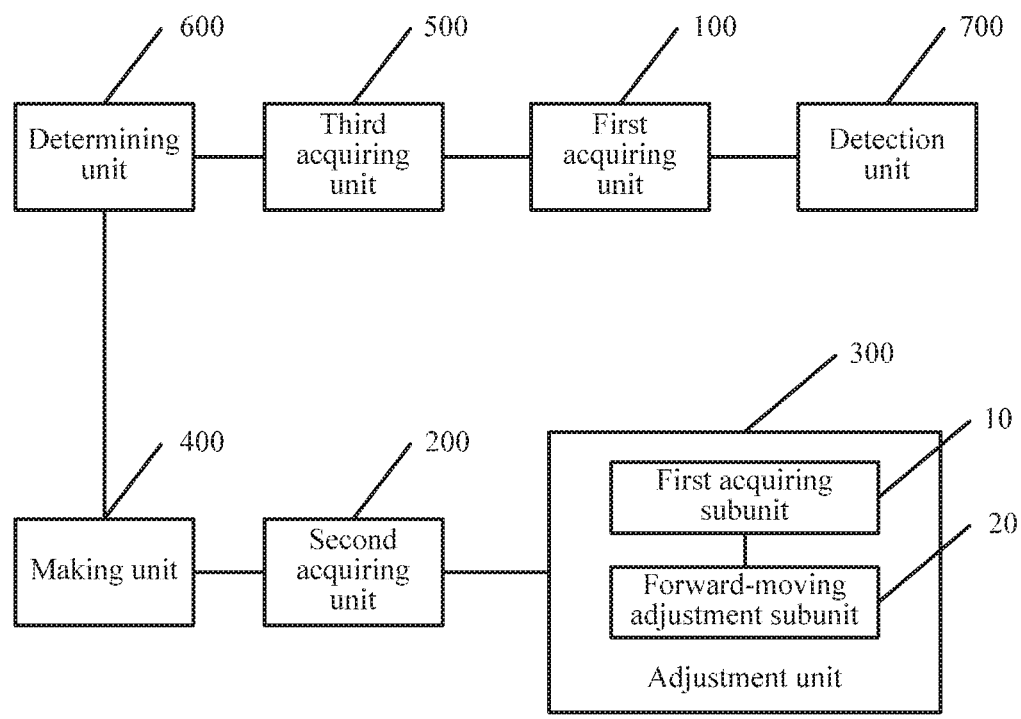
FIG. 6 is a schematic structural diagram of an apparatus according to an embodiment of the present invention.

Referring to FIG. 6, FIG. 6 is an apparatus provided in an embodiment of the present invention. As shown in FIG. 6, the apparatus of this embodiment may include: the first acquiring unit 100, the second acquiring unit 200, the adjustment unit 300, the making unit 400, the third acquiring unit 500, the determining unit 600, and a detection unit 700.

The adjustment unit 300 includes:

a first acquiring subunit 10, configured to: when the adjustment policy is used to indicate a forward-moving adjustment direction of the to-be-adjusted heartbeat, acquire a first heartbeat in a unified heartbeat period, where a time interval between the first heartbeat and the to-be-adjusted heartbeat is the smallest, and a time point of the first heartbeat is earlier than or equal to a time point of the to-be-adjusted heartbeat; and a forward-moving adjustment subunit 20, configured to move the time point of the to-be-adjusted heartbeat forward to the time point of the first heartbeat, to obtain the adjusted heartbeat.

The apparatus further includes:

the detection unit 700, configured to: before the network holding time period of the application program is acquired, detect whether a unified heartbeat system is already started, where the first acquiring unit 100 is specifically configured to: when the detection unit 700 detects that the unified heartbeat system is already started, acquire the network holding time period of the application program.

It may be understood that, functions of functional modules of the apparatus of this embodiment may be specifically implemented according to the methods in the foregoing method embodiments; for specific implementation processes, reference may be made to related descriptions for the foregoing method embodiments, and details are not described herein again.

In this embodiment of the present invention, a network holding time period of an application program and an initial heartbeat of the application program are acquired in this embodiment of the present invention, and a to-be-adjusted heartbeat of the application program is acquired according to the network holding time period and the initial heartbeat, so as to acquire a preset unified heartbeat; the to-be-adjusted heartbeat is adjusted according to the at least one preset unified heartbeat to obtain an adjusted heartbeat, so that the apparatus can flexibly adjust a heartbeat of the application program according to a service requirement of the application program, and adjust a position of the heartbeat of the running application program to a position of a unified heartbeat, to improve user experience and reduce power consumption.

Figure 7:
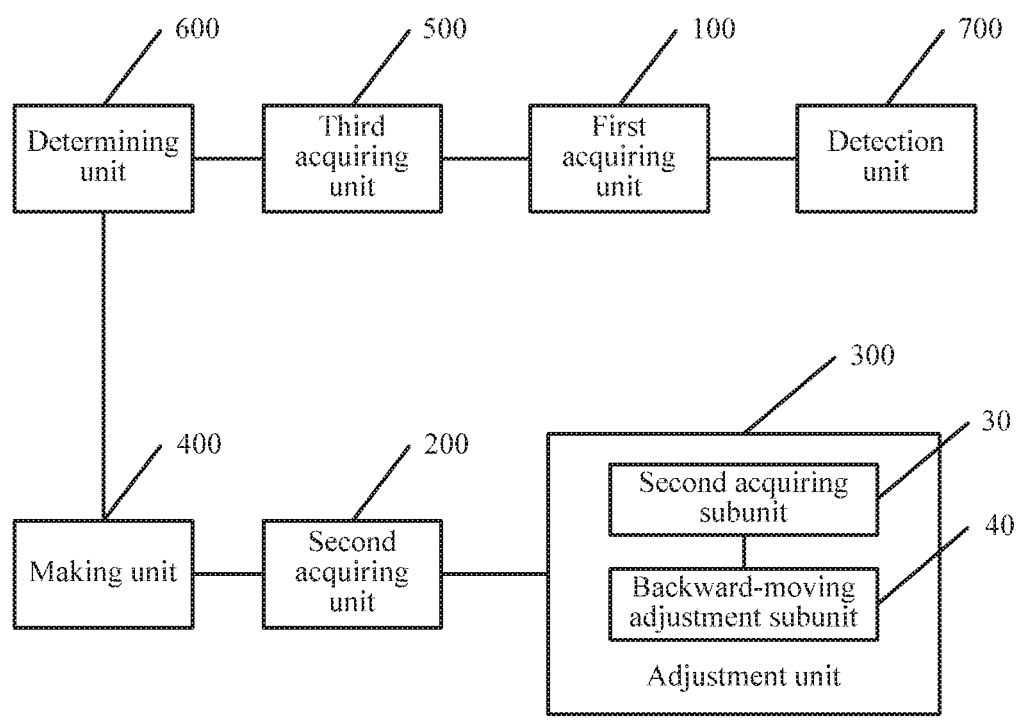
FIG. 7 is a schematic structural diagram of an apparatus according to an embodiment of the present invention.

Referring to FIG. 7, FIG. 7 is an apparatus provided in an embodiment of the present invention. As shown in FIG. 7, the apparatus of this embodiment my include: the first acquiring unit 100, the second acquiring unit 200, the adjustment unit 300, the making unit 400, the third acquiring unit 500, the determining unit 600, and the detection unit 700.

The adjustment unit 300 includes:

a second acquiring subunit 30, configured to: when the adjustment policy is used to indicate a backward-moving adjustment direction of the to-be-adjusted heartbeat, acquire a second heartbeat in a unified heartbeat period, where a time interval between the second heartbeat and the to-be-adjusted heartbeat is the smallest, and a time point of the second heartbeat is later than or equal to a time point of the to-be-adjusted heartbeat; and a backward-moving adjustment subunit 40, configured to move the time point of the to-be-adjusted heartbeat backward to the time point of the second heartbeat, to obtain the adjusted heartbeat.

It may be understood that, functions of functional modules of the apparatus of this embodiment may be specifically implemented according to the methods in the foregoing method embodiments; for specific implementation processes, reference may be made to related descriptions for the foregoing method embodiments, and details are not described herein again.

In this embodiment of the present invention, a network holding time period of an application program and an initial heartbeat of the application program are acquired in this embodiment of the present invention, and a to-be-adjusted heartbeat of the application program is acquired according to the network holding time period and the initial heartbeat, so as to acquire a preset unified heartbeat; the to-be-adjusted heartbeat is adjusted according to the at least one preset unified heartbeat to obtain an adjusted heartbeat, so that the apparatus can flexibly adjust a heartbeat of the application program according to a service requirement of the application program, and adjust a position of the heartbeat of the running application program to a position of a unified heartbeat, to improve user experience and reduce power consumption.

Figure 8:
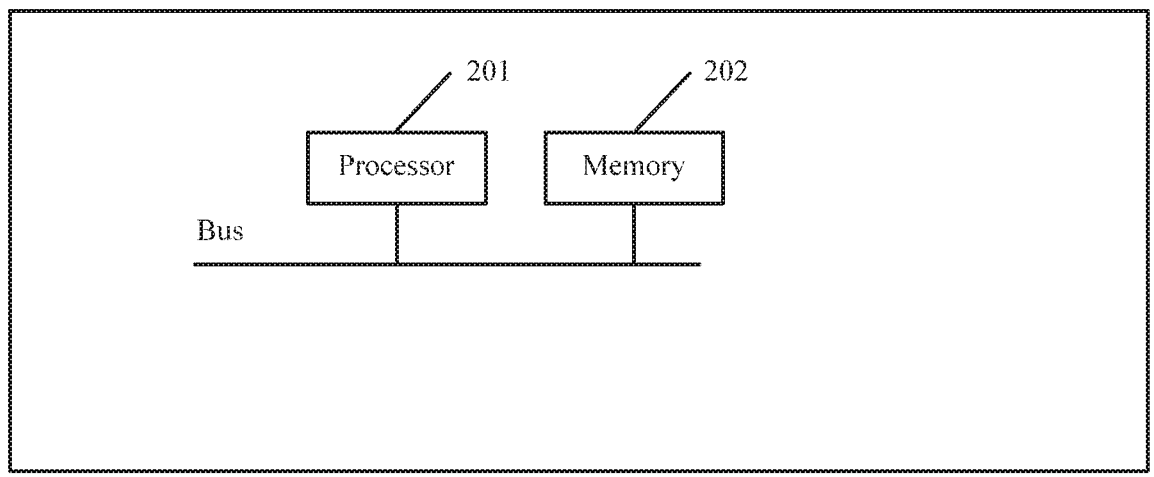
FIG. 8 is a schematic structural diagram of a terminal according to an embodiment of the present invention.

Referring to FIG. 8, FIG. 8 is a schematic structural diagram of a terminal according to an embodiment of the present invention. As shown in FIG. 8, the terminal of this embodiment may include:

a processor 201 (where there may be one or more processors 201 in the terminal, and one processor is used as an example in FIG. 8) and a memory 202. In this embodiment of the present invention, the processor 201 and the memory 202 may be connected by means of a bus or in another manner, where connection by means of a bus is used as an example in FIG. 8.

The processor 201 executes the following steps:

acquiring a network holding time period of an application program;

acquiring an initial heartbeat of the application program, and acquiring a to-be-adjusted heartbeat of the application program according to the network holding time period and the initial heartbeat; and acquiring at least one preset unified heartbeat, and adjusting the to-be-adjusted heartbeat according to the at least one preset unified heartbeat to obtain an adjusted heartbeat, where the adjusted heartbeat coincides with a unified heartbeat in the at least one unified heartbeat.

The processor 201 is further configured to: after acquiring the network holding time period of the application program, acquire a service parameter of the application program, and make an adjustment policy for a heartbeat of the application program according to the service parameter, where the adjustment policy is used to indicate an adjustment direction of the to-be-adjusted heartbeat, and the adjustment direction includes any one of a forward-moving adjustment direction, a backward-moving adjustment direction, and no adjustment; and the adjusting, by the processor 201, the to-be-adjusted heartbeat according to the at least one preset unified heartbeat to obtain an adjusted heartbeat includes: adjusting the to-be-adjusted heartbeat according to the unified heartbeat and the adjustment policy to obtain the adjusted heartbeat.

The processor 201 is further configured to: before acquiring the service parameter of the application program, and making the adjustment policy for the heartbeat of the application program according to the service parameter, acquire a preset unified heartbeat, and acquire, in the unified heartbeat, a first time interval between adjacent unified heartbeats; and determine whether the network holding time period is greater than the first time interval; and when the network holding time period is greater than the first time interval, perform the step of acquiring a service parameter of the application program, and making an adjustment policy for a heartbeat of the application program according to the service parameter.

A time interval between the to-be-adjusted heartbeat and the initial heartbeat is the network holding time period of the application program.

The adjusting, by the processor 201, the to-be-adjusted heartbeat according to the unified heartbeat and the adjustment policy to obtain the adjusted heartbeat includes:

when the adjustment policy is used to indicate a forward-moving adjustment direction of the to-be-adjusted heartbeat, acquiring a first heartbeat in a unified heartbeat period, where a time interval between the first heartbeat and the to-be-adjusted heartbeat is the smallest, and a time point of the first heartbeat is earlier than or equal to a time point of the to-be-adjusted heartbeat; and moving the time point of the to-be-adjusted heartbeat forward to the time point of the first heartbeat, to obtain the adjusted heartbeat.

The adjusting, by the processor 201, the to-be-adjusted heartbeat according to the unified heartbeat and the adjustment policy to obtain the adjusted heartbeat includes:

when the adjustment policy is used to indicate a backward-moving adjustment direction of the to-be-adjusted heartbeat, acquiring a second heartbeat in a unified heartbeat period, where a time interval between the second heartbeat and the to-be-adjusted heartbeat is the smallest, and a time point of the second heartbeat is later than or equal to a time point of the to-be-adjusted heartbeat; and moving the time point of the to-be-adjusted heartbeat backward to the time point of the second heartbeat, to obtain the adjusted heartbeat.

The processor 201 is further configured to: before acquiring the network holding time period of the application program, detect whether a unified heartbeat system is already started; and when detecting that the unified heartbeat system is already started, perform the step of acquiring a network holding time period of an application program.

It may be understood that, functions of functional modules of the terminal of this embodiment may be specifically implemented according to the methods in the foregoing method embodiments; for specific implementation processes, reference may be made to related descriptions for the foregoing method embodiments, and details are not described herein again.

It can be seen from the foregoing that, in some feasible implementation manners of the present invention, in this embodiment of the present invention, a network holding time period of an application program and an initial heartbeat of the application program are acquired, and a to-be-adjusted heartbeat of the application program is acquired according to the network holding time period and the initial heartbeat, so as to acquire a preset unified heartbeat; the to-be-adjusted heartbeat is adjusted according to the at least one preset unified heartbeat to obtain an adjusted heartbeat, so that the apparatus can flexibly adjust a heartbeat of the application program according to a service requirement of the application program, and adjust a position of the heartbeat of the running application program to a position of a unified heartbeat, to improve user experience and reduce power consumption.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously.

In addition, a person skilled in the art should also understand that the embodiments described in this specification all belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

In conclusion, in some embodiments of the present invention, a network holding time period of an application program and an initial heartbeat of the application program are acquired in the embodiments of the present invention, and a to-be-adjusted heartbeat of the application program is acquired according to the network holding time period and the initial heartbeat, so as to acquire a preset unified heartbeat; the to-be-adjusted heartbeat is adjusted according to the at least one preset unified heartbeat to obtain an adjusted heartbeat, so that the apparatus can flexibly adjust a heartbeat of the application program according to a service requirement of the application program, and adjust a position of the heartbeat of the running application program to a position of a unified heartbeat, to improve user experience and reduce power consumption.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A computer-implemented method for adjusting heartbeat of an application program, the method comprising:
    acquiring a network holding time period of an application program, wherein the network holding time period is a maximum online time of a service of the application program;
    acquiring an initial heartbeat of the application program, and acquiring a to-be-adjusted heartbeat of the application program according to the network holding time period and the initial heartbeat; and
    acquiring at least one preset unified heartbeat, and adjusting the to-be-adjusted heartbeat according to the at least one preset unified heartbeat to obtain an adjusted heartbeat, wherein the adjusted heartbeat coincides with a unified heartbeat in the at least one preset unified heartbeat;
    wherein a time interval between the adjusted heartbeat and the initial heartbeat of the application program is less than the network holding time period.

2. The method according to claim 1, further comprising:
    after acquiring the network holding time period of the application program,
        acquiring a service parameter of the application program, and making an adjustment policy for a heartbeat of the application program according to the service parameter, wherein the adjustment policy is used to indicate an adjustment direction of the to-be-adjusted heartbeat, and the adjustment direction comprises any one of a forward-moving adjustment direction, a backward-moving adjustment direction, and no adjustment; and wherein adjusting the to-be-adjusted heartbeat according to the at least one preset unified heartbeat to obtain an adjusted heartbeat comprises:

adjusting the to-be-adjusted heartbeat according to the unified heartbeat and the adjustment policy to obtain the adjusted heartbeat.

3. The method according to claim 2, further comprising:

before acquiring the service parameter of the application program, and making the adjustment policy for the heartbeat of the application program according to the service parameter, acquiring the at least one preset unified heartbeat, and acquiring, in the unified heartbeat, a first time interval between adjacent unified heartbeats;

determining whether the network holding time period is greater than the first time interval; and when the network holding time period is greater than the first time interval, acquiring the service parameter of the application program, and making the adjustment policy for the heartbeat of the application program according to the service parameter.

4. The method according to claim 2, wherein a time interval between the to-be-adjusted heartbeat and the initial heartbeat is the network holding time period of the application program.

5. The method according to claim 2, wherein adjusting the to-be-adjusted heartbeat according to the unified heartbeat and the adjustment policy to obtain the adjusted heartbeat comprises:

when the adjustment policy is used to indicate a forward-moving adjustment direction of the to-be-adjusted heartbeat, acquiring a first heartbeat in a unified heartbeat period, wherein a time interval between the first heartbeat and the to-be-adjusted heartbeat is the smallest, and a time point of the first heartbeat is earlier than or equal to a time point of the to-be-adjusted heartbeat; and moving the time point of the to-be-adjusted heartbeat forward to the time point of the first heartbeat, to obtain the adjusted heartbeat.

6. The method according to claim 2, wherein adjusting the to-be-adjusted heartbeat according to the unified heartbeat and the adjustment policy to obtain the adjusted heartbeat comprises:

when the adjustment policy is used to indicate a backward-moving adjustment direction of the to-be-adjusted heartbeat, acquiring a second heartbeat in a unified heartbeat period, wherein a time interval between the second heartbeat and the to-be-adjusted heartbeat is the smallest, and a time point of the second heartbeat is later than or equal to a time point of the to-be-adjusted heartbeat; and moving the time point of the to-be-adjusted heartbeat backward to the time point of the second heartbeat, to obtain the adjusted heartbeat.

7. The method according to claim 1, further comprising:

before acquiring the network holding time period of the application program, detecting whether a unified heartbeat system has started; and when detecting that the unified heartbeat system has started, acquiring the network holding time period of the application program.

8. A non-transitory computer-readable medium having instructions stored therein, which when executed by a processor, cause the processor to perform operations, the operations comprising:

acquiring a network holding time period of an application program, wherein the network holding time period is a maximum online time of a service of the application program;

acquiring an initial heartbeat of the application program, and acquiring a to-be-adjusted heartbeat of the application program according to the network holding time period and the initial heartbeat; and acquiring at least one preset unified heartbeat, and adjusting the to-be-adjusted heartbeat according to the at least one preset unified heartbeat to obtain an adjusted heartbeat, wherein the adjusted heartbeat coincides with a unified heartbeat in the at least one preset unified heartbeat;

wherein a time interval between the adjusted heartbeat and the initial heartbeat of the application program is less than the network holding time period.

9. A terminal comprising a memory and a processor, the processor and the memory are coupled to each other using a bus, wherein the processor is configured to:

acquire a network holding time period of an application program, wherein the network holding time period is a maximum online time of a service of the application program;

acquire an initial heartbeat of the application program, and acquire a to-be-adjusted heartbeat of the application program according to the network holding time period and the initial heartbeat; and acquire at least one preset unified heartbeat, and adjust the to-be-adjusted heartbeat according to the at least one preset unified heartbeat to obtain an adjusted heartbeat, wherein the adjusted heartbeat coincides with a unified heartbeat in the at least one preset unified heartbeat;

wherein a time interval between the adjusted heartbeat and the initial heartbeat of the application program is less than the network holding time period.

10. The terminal according to claim 9, wherein the processor is further configured to:

after acquiring the network holding time period of the application program, acquire a service parameter of the application program, and make an adjustment policy for a heartbeat of the application program according to the service parameter, wherein the adjustment policy is used to indicate an adjustment direction of the to-be-adjusted heartbeat, and the adjustment direction comprises any one of a forward-moving adjustment direction, a backward-moving adjustment direction, and no adjustment; and wherein adjust the to-be-adjusted heartbeat according to the at least one preset unified heartbeat to obtain the adjusted heartbeat comprises adjust the to-be-adjusted heartbeat according to the unified heartbeat and the adjustment policy to obtain the adjusted heartbeat.

11. The terminal according to claim 10, wherein the processor is further configured to:

before acquiring the service parameter of the application program, and making the adjustment policy for the heartbeat of the application program according to the service parameter, acquire a preset unified heartbeat, and acquire, in the unified heartbeat, a first time interval between adjacent unified heartbeats;

determine whether the network holding time period is greater than the first time interval; and when the network holding time period is greater than the first time interval, acquire the service parameter of the application program, and make the adjustment policy for the heartbeat of the application program according to the service parameter.

12. The terminal according to claim 10, wherein a time interval between the to-be-adjusted heartbeat and the initial heartbeat is the network holding time period of the application program.

13. The terminal according to claim 10, wherein adjust the to-be-adjusted heartbeat according to the unified heartbeat and the adjustment policy to obtain the adjusted heartbeat comprises:
   when the adjustment policy is used to indicate a forward-moving adjustment direction of the to-be-adjusted heartbeat, acquire a first heartbeat in a unified heartbeat period, wherein a time interval between the first heartbeat and the to-be-adjusted heartbeat is the smallest, and a time point of the first heartbeat is earlier than or equal to a time point of the to-be-adjusted heartbeat; and
   move the time point of the to-be-adjusted heartbeat forward to the time point of the first heartbeat, to obtain the adjusted heartbeat.

14. The terminal according to claim 10, wherein adjust the to-be-adjusted heartbeat according to the unified heartbeat and the adjustment policy to obtain the adjusted heartbeat comprises:
   when the adjustment policy is used to indicate a backward-moving adjustment direction of the to-be-adjusted heartbeat, acquire a second heartbeat in a unified heartbeat period, wherein a time interval between the second heartbeat and the to-be-adjusted heartbeat is the smallest, and a time point of the second heartbeat is later than or equal to a time point of the to-be-adjusted heartbeat; and
   move the time point of the to-be-adjusted heartbeat backward to the time point of the second heartbeat, to obtain the adjusted heartbeat.

15. The terminal according to claim 9, wherein the processor is further configured to:
   before acquiring the network holding time period of the application program, detect whether a unified heartbeat system has started; and when detect that the unified heartbeat system has started, acquire a network holding time period of an application program.

* * * * *